United States Patent
Ito et al.

(10) Patent No.: US 8,008,401 B2
(45) Date of Patent: Aug. 30, 2011

(54) POLYOLEFIN COMPOSITION

(75) Inventors: Yuichi Ito, Chiba (JP); Kazuki Mita, Chiba (JP); Ryoji Mori, Ichihara (JP); Masahiko Okamoto, Chiba (JP); Toru Takehara, Ichihara (JP); Masakazu Jitsukata, Isumi (JP); Hayato Kurita, Nagoya (JP)

(73) Assignee: Mitsui Chemicals, Inc., Tokyo (JP)

( * ) Notice: Subject to any disclaimer, the term of this patent is extended or adjusted under 35 U.S.C. 154(b) by 168 days.

(21) Appl. No.: 12/311,034

(22) PCT Filed: Sep. 10, 2007

(86) PCT No.: PCT/JP2007/067608
§ 371 (c)(1),
(2), (4) Date: Mar. 17, 2009

(87) PCT Pub. No.: WO2008/035584
PCT Pub. Date: Mar. 27, 2008

(65) Prior Publication Data
US 2010/0004401 A1    Jan. 7, 2010

(30) Foreign Application Priority Data
Sep. 20, 2006  (JP) .................. 2006-254798

(51) Int. Cl.
C08F 8/00      (2006.01)
C08L 9/00      (2006.01)
C08L 23/04     (2006.01)
C08L 45/00     (2006.01)
C08G 18/42     (2006.01)
C09B 67/00     (2006.01)
C08K 5/00      (2006.01)

(52) U.S. Cl. ........ 525/191; 525/211; 525/232; 525/240; 524/500; 524/502; 524/515; 524/518; 524/525

(58) Field of Classification Search .................. 525/191, 525/211, 232, 240; 524/500, 502, 515, 518, 524/525
See application file for complete search history.

(56) References Cited

U.S. PATENT DOCUMENTS

| | | | |
|---|---|---|---|
| 5,834,562 A | 11/1998 | Silvestri et al. | |
| 6,340,531 B1 | 1/2002 | Konda et al. | |
| 6,632,885 B2 * | 10/2003 | Morizono et al. | ............ 525/191 |
| 2007/0172683 A1 | 7/2007 | Ito et al. | |
| 2007/0225431 A1 | 9/2007 | Mori et al. | |

FOREIGN PATENT DOCUMENTS

| | | |
|---|---|---|
| EP | 0 618 259 A2 | 3/1993 |
| EP | 1 712 350 A1 | 10/2006 |
| EP | 1 741 747 A1 | 1/2007 |
| JP | 3-70742 | 11/1991 |
| JP | 7-53789 A | 2/1995 |
| JP | 8-034297 A | 2/1996 |
| JP | 8-59916 A | 3/1996 |
| JP | 8-85741 A | 4/1996 |
| JP | 2904708 B2 | 3/1999 |
| JP | 2000-191858 A | 7/2000 |
| WO | WO 2005/053951 A1 | 6/2005 |
| WO | WO 2005/103141 A1 | 11/2005 |

OTHER PUBLICATIONS

Communication in EP Appln No. 07807017.4 dated Dec. 3, 2010.

* cited by examiner

*Primary Examiner* — Nathan M Nutter
(74) *Attorney, Agent, or Firm* — Foley & Lardner LLP

(57) ABSTRACT

A polyolefin composition comprising an olefin-based thermoplastic elastomer which is superior to conventional olefin-based thermoplastic elastomers in scratch resistance and abrasion resistance and has excellent heat aging resistance is proposed. [Means for Solving the Problem] A polyolefin composition comprising a syndiotactic α-olefin-based copolymer (A), a polyolefin resin (B) (other than polybutene (C)), polybutene (C), and if necessary, an ethylene-based copolymer rubber (D).

16 Claims, 1 Drawing Sheet

[Fig. 1]
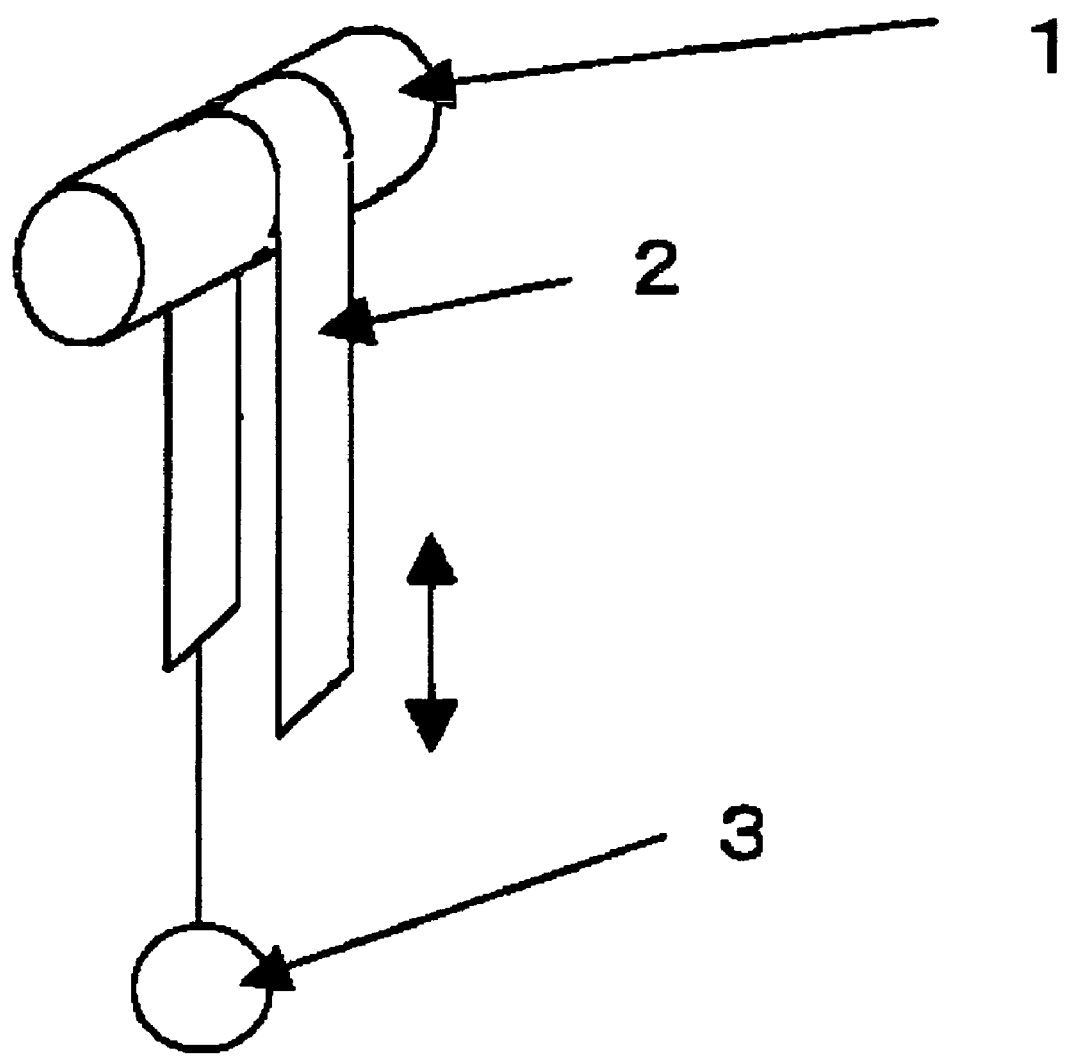

POLYOLEFIN COMPOSITION

TECHNICAL FIELD

The present invention relates to a polyolefin composition.

BACKGROUND ART

For interior trim members of automobiles, a soft vinyl chloride resin has been widely used in the past. Since the soft vinyl chloride resin is excellent in molding processability into parts and is relatively inexpensive, it has been used much for interior trim skin materials of instrument panels, doors, ceilings and the like, handle materials, lever knobs, various grips, etc. In recent years, however, there has been pointed out a possibility that the vinyl chloride resin becomes a cause of a poisonous gas when incinerated, so that replacement of the soft vinyl chloride resin used for the above parts with materials other than the soft vinyl chloride resin has been studied.

Particularly for the automobile interior trim parts, an olefin-based thermoplastic elastomer is most widely used as a substitute for the soft vinyl chloride resin. The olefin-based thermoplastic elastomer is a material excellent in various points such that it is lightweight, is excellent in moldability and processability into parts, can be readily recycled and generates no poisonous gas during combustion, but on the other hand, it has a disadvantage of poor scratch resistance.

On this account, the olefin-based thermoplastic elastomer has not been used as it is for the parts requiring scratch resistance, and in the actual circumstances, an elastomer having been improved in scratch resistance by subjecting it to surface treatment or the like is employed (see, for example, patent document 1).

As the olefin-based thermoplastic elastomer having been improved in scratch resistance, a composition obtained by adding a hydrogenation product of a styrene/isoprene block copolymer having a large quantity of 3,4-bonds of polyisoprene block moieties to a crosslinked olefin-based thermoplastic elastomer containing polypropylene and EPDM as basic components and prepared by dynamic crosslinking has been proposed (see, for example, patent document 2). The hydrogenation product, however, not only has tackiness but also is expensive as compared with the soft vinyl chloride resin that has been mainly used in the past, and hence, use of the composition is restricted in the actual circumstances.

Further, a composition having been improved in scratch resistance by adding polybutene to the above-mentioned crosslinked olefin-based thermoplastic elastomer has been proposed (see, for example, patent document 3). This composition is superior to the general-purpose crosslinked olefin-based thermoplastic elastomer in scratch resistance, but actually, it is inferior in appearance to the soft vinyl chloride resin that has been used in the past.

Under such circumstances as above, the present inventors have found that compositions of a propylene/ethylene copolymer having a syndiotactic structure, a propylene/butene/ethylene copolymer having the same structure and a polyolefin resin are very excellent in scratch resistance and abrasion resistance, and by combining them with an appropriate lubricant, etc., they exhibit scratch resistance and abrasion resistance comparable to those of the soft vinyl chloride resin (see, for example, patent documents 4 and 5). These compositions, however, are inferior in heat aging resistance, and the gloss varies in the aging test of 100° C. and about 24 hours, so that it is difficult to use them for automobiles.

Patent document 1: Japanese Patent Publication No. 070742/1991
Patent document 2: Japanese Patent Laid-Open Publication No. 053789/1995
Patent document 3: Japanese Patent No. 2904708
Patent document 4: pamphlet of International Publication No. 2005/053951
Patent document 5: pamphlet of International Publication No. 2005/103141

DISCLOSURE OF THE INVENTION

Problem to be Solved by the Invention

The present invention is intended to solve the problems associated with the prior art and proposes a polyolefin composition which is superior to conventional polyolefin compositions in scratch resistance and abrasion resistance and has excellent heat aging resistance.

Means to Solve the Problem

Summary

The polyolefin-composition of the present invention is a polyolefin composition comprising:
(A) a syndiotactic α-olefin-based copolymer,
(B) a polyolefin resin (other than polybutene (C)), and
(C) polybutene,
wherein the syndiotactic α-olefin-based copolymer (A) has properties that regarding absorptions of methyl groups of propylene units in $^{13}$C-NMR of the copolymer (A) measured in a 1,2,4-trichlorobenzene solution, the sum total of absorption intensities of peaks observed at 20.0 to 21.0 ppm on the basis of tetramethylsilane is not less than 0.5 of the absorption intensities at 19.0 to 22.0 ppm assigned to all the methyl groups of propylene; the copolymer (A) comprises:
(a-1) repeating units derived from propylene,
(a-2) repeating units derived from ethylene,
and if necessary,
(a-3) repeating units derived from an olefin of 4 to 20 carbon atoms, and/or
(a-4) repeating units derived from at least one polyene selected from conjugated polyenes and non-conjugated polyenes;
the copolymer (A) contains
the units (a-1) in amounts of 30 to 79% by mol,
the units (a-2) in amounts of 1 to 30% by mol,
the units (a-3) in amounts of 0 to 50% by mol,
(with the proviso that the units (a-2) and the units (a-3) are contained in the total amount of 21 to 70% by mol in 100% by mol of the total amount of the units, (a-1), the units (a-2) and the units (a-3)), and
the units (a-4) in amounts of 0 to 30% by mol based on 100% by mol of the total amount of the units (a-1), the units (a-2) and the units (a-3)); and
the copolymer (A) substantially has a syndiotactic structure.

The polyolefin resin (B) (other than polybutene (C)) is preferably syndiotactic and/or isotactic polypropylene.

It is preferable that in the polyolefin composition, the syndiotactic α-olefin-based copolymer (A) is blended in an amount of 1 to 98 parts by weight, the polyolefin resin (B) (other than polybutene (C)) is blended in an amount of 98 to 1 part by weight, and the polybutene (C) is blended in an amount of 1 to 70 parts by weight, with the proviso that the total amount of the components (A), (B) and (C) is 100 parts by weight.

The polyolefin composition may further comprise an ethylene-based copolymer rubber (D), in addition to the syndiotactic α-olefin-based copolymer (A), the polyolefin resin (B) (other than polybutene (C)) and the polybutene (C), and the ethylene-based copolymer rubber (D) may have been crosslinked.

In the polyolefin composition, the ethylene-based copolymer rubber (D) is preferably blended in an amount of 5 to 1000 parts by weight based on 100 parts by weight of the total amount of the syndiotactic α-olefin-based copolymer (A), the polyolefin resin (B) (other than polybutene (C)) and the polybutene (C).

It is preferable that the syndiotactic α-olefin-based copolymer (A) does not have a melting peak measured by a differential scanning calorimeter (DSC) and has an intrinsic viscosity [η], as measured in decalin at 135° C., of 0.01 to 10 dl/g, a molecular weight distribution (Mw/Mn), as determined by GPC, of not more than 4 and a glass transition temperature (Tg) of not higher than −5° C.

The syndiotactic α-olefin-based copolymer (A) may have been crosslinked.

The polybutene (C) is preferably a homopolymer of 1-butene or a copolymer consisting of 1-butene and an olefin other than 1-butene and having a 1-butene content of not less than 50% by mol.

The polyolefin composition is preferably used for an automobile interior trim skin part produced by vacuum forming, stamping, powder slush molding or injection molding, or an automobile seal part produced by extrusion molding or injection molding.

Effect of the Invention

Such a polyolefin composition as mentioned above is excellent in moldability, heat resistance, scratch resistance, abrasion resistance and flexibility balance and is also excellent in heat aging resistance.

BRIEF DESCRIPTION OF THE DRAWING

FIG. 1 is an explanatory view showing a reciprocating abrasion test method for grip.

DESCRIPTION OF NUMERICAL SYMBOLS

1: grip
2: cotton canvas
3: weight of 300 g

BEST MODE FOR CARRYING OUT THE INVENTION

Detailed Description of the Invention

The polyolefin composition of the invention is described in detail hereinafter.

The polyolefin composition of the invention is a polyolefin composition comprising a syndiotactic α-olefin-based copolymer (A), a polyolefin resin (B) (other than polybutene (C)) and polybutene (C).

In the composition, there are blended the syndiotactic α-olefin-based copolymer (A) in an amount of 1 to 98 parts by weight, preferably 10 to 95 parts by weight, more preferably 10 to 90 parts by weight, particularly preferably 20 to 90 parts by weight, most preferably 30 to 85 parts by weight, the polyolefin resin (B) (other than polybutene (C)) in an amount of 98 to 1 part by weight, preferably 89 to 4 parts by weight, more preferably 77 to 7 parts by weight, particularly preferably 67 to 7 parts by weight, most preferably 47 to 7 parts by weight, and the polybutene (C) in an amount of 1 to 70 parts by weight, preferably 1 to 50 parts by weight, more preferably 3 to 30 parts by weight, particularly preferably 3 to 25 parts by weight, most preferably 5 to 20 parts by weight, based on 100 parts by weight of the total amount of the syndiotactic α-olefin-based copolymer (A), the polyolefin resin (B) (other than polybutene (C)) and the polybutene (C).

If necessary, an ethylene-based copolymer rubber (D) can be further blended in an amount of 5 to 1000 parts by weight, preferably 10 to 500 parts by weight, more preferably 15 to 300 parts by weight, particularly preferably 20 to 200 parts by weight, most preferably 30 to 100 parts by weight, based on 100 parts by weight of the total amount of the syndiotactic α-olefin-based copolymer (A), the polyolefin resin (B) (other than polybutene (C)) and the polybutene (C).

Syndiotactic α-Olefin-Based Copolymer (A)

First, the syndiotactic α-olefin-based copolymer (A) is described.

The syndiotactic α-olefin-based copolymer (A) according to the invention is an α-olefin-based copolymer substantially having a syndiotactic structure. The expression "substantially having a syndiotactic structure" means that in $^{13}$C-NMR of the copolymer (A) measured in a 1,2,4-trichlorobenzene solution, the sum total of absorption intensities of methyl groups of propylene units observed at about 20.0 to 21.0 ppm on the basis of tetramethylsilane is not less than 0.5, preferably not less than 0.6, more preferably not less than 0.7, of the sum total of absorption intensities at about 19.0 to 22.0 ppm assigned to propylene methyl.

The syndiotactic structure is measured in the following manner. That is to say, 0.35 g of a sample is dissolved in 2.0 ml of hexachlorobutadiene by heating. This solution is filtered through a glass filter (G2), then 0.5 ml of deuterated benzene is added, and the resulting solution is introduced into a NMR tube having an inner diameter of 10 mm. Using a GX-500 type NMR measuring device manufactured by JEOL Ltd., $^{13}$C-NMR measurement is carried out at 120° C. The number of integrating times is 10,000 or more. When the syndiotactic α-olefin-based copolymer (A) is in such a range as above, the copolymer (A) is excellent in syndiotactic properties and tends to be excellent in transparency, flexibility and abrasion resistance.

The syndiotactic α-olefin-based copolymer (A) according to the invention contains propylene component units (a-1) in amounts of 30 to 79% by mol, ethylene component units (a-2) in amounts of 1 to 30% by mol and component units (a-3) derived from an α-olefin of 4 to 20 carbon atoms in amounts of 0 to 50% by mol (when the amount of all the component units in the copolymer (A) is 100% by mol, the total amount of the ethylene component units (a-2) and the component units (a-3) derived from an α-olefin of 4 to 20 carbon atoms is in the range of 21 to 70% by mol); the copolymer (A) preferably contains propylene component units (a-1) in amounts of 35 to 75% by mol, ethylene component units (a-2) in amounts of 3 to 25% by mol and component units (a-3) derived from an α-olefin of 4 to 20 carbon atoms in amounts of 10 to 45% by mol (when the amount of all the component units in the copolymer (A) is 100% by mol, the total amount of the ethylene component units (a-2) and the component units (a-3) derived from an α-olefin of 4 to 20 carbon atoms is in the range of 25 to 65% by mol); the copolymer (A) particularly preferably contains propylene component units (a-1) in amounts of 35 to 65% by mol, ethylene component units (a-2) in amounts of 3 to 25% by mol and component units (a-3) derived from an α-olefin of 4 to 20 carbon atoms in amounts of 20 to 45% by mol (when the amount of all the component units in the copolymer (A) is 100% by mol, the total amount of the ethylene component units (a-2) and the component units (a-3) derived from an α-olefin of 4 to 20 carbon atoms is in the range of 35 to 65% by mol); and the copolymer (A) more preferably contains propylene component units (a-1) in amounts of 40 to 65% by mol, ethylene component units (a-2) in amounts of 5 to 25% by mol and component units (a-3) derived from an α-olefin of 4 to 20 carbon atoms in amounts of 20 to 40% by mol (when the amount of all the component units in the copolymer (I) is 100% by mol, the total amount of the ethylene component units (a-2) and the component units (a-3) derived from an α-olefin of 4 to 20 carbon atoms is in the range of 35 to 60% by mol). The copolymer (A) may further contain repeating units (a-4) derived from at least one polyene selected from conjugated polyenes and non-conjugated polyenes in amounts of 0 to 30% by mol, preferably 0 to 25% by mol, based on 100% by mol of the total amount of the propylene component units (a-1), the ethylene component units (a-2) and the component units (a-3) derived from an α-olefin of 4 to 20 carbon atoms. The syndiotactic α-olefin-based copolymer (A) containing the propylene component (a-1), the ethylene component (a-2), the component (a-3) derived from an α-olefin of 4 to 20 carbon atoms, and the optionally used component (a-4) derived from at least one polyene selected from conjugated polyenes and non-conjugated polyenes in such amounts as above becomes excellent in compatibility with the thermoplastic resin, and the resulting polyolefin composition tends to exhibit flexibility, elastomeric properties, scratch resistance and abrasion resistance.

The α-olefin used for preparing such a syndiotactic α-olefin-based copolymer (A) is not specifically restricted provided that the number of carbon atoms is in the range of 4 to 20, preferably 4 to 12, and the copolymer (A) may be straight-chain or branched.

Examples of such α-olefins include 1-butene, 2-butene, 1-pentene, 1-hexene, 1-heptane, 1-octene, 1-nonene, 1-decene, 1-undecene, 1-dodecene, 3-methyl-1-butene, 3-methyl-1-pentene, 4-methyl-1-pentene, 4-methyl-1-hexene, 4,4-dimethyl-1-hexene, 4,4-dimethyl-1-pentene, 4-ethyl-1-hexene and 3-ethyl-1-hexene. Of these, preferable are 1-butene, 1-hexene, 1-octene, 1-decene and 4-methyl-1-pentene, more preferable are 1-butene, 1-hexene, 1-octene and 1-decene, and particularly preferable is 1-butene.

These α-olefins can be used singly or in combination of two or more kinds. For example, at least one α-olefin (a) selected from α-olefins of 4 to 20 carbon atoms and an α-olefin (b) which is selected from the α-olefins of 4 to 20 carbon atoms and is different from the α-olefin (a) can be used in an (a)/(b) quantity ratio of (50 to 99% by mol)/(1 to 50% by mol) ((a)+(b)=100% by mol).

The repeating unit derived from at least one polyene selected from conjugated polyenes and non-conjugated polyenes, said polyene being used for preparing the syndiotactic α-olefin-based copolymer (A), is a repeating unit derived from at least one polyene selected from the following conjugated polyenes and non-conjugated polyenes.

Examples of the conjugated polyenes include conjugated dienes, such as 1,3-butadiene, 1,3-pentadiene, 1,3-hexadiene, 1,3-heptadiene, 1,3-octadiene, 1-phenyl-1,3-butadiene, 1-phenyl-2,4-pentadiene, isoprene, 2-ethyl-1,3-butadiene, 2-propyl-1,3-butadiene, 2-butyl-1,3-butadiene, 2-pentyl-1,3-butadiene, 2-hexyl-1,3-butadiene, 2-heptyl-1,3-butadiene, 2-octyl-1,3-butadiene and 2-phenyl-1,3-butadiene; and conjugated trienes, such as 1,3,5-hexatriene. Of these, butadiene, isoprene, pentadiene, hexadiene and octadiene are preferable, and butadiene and isoprene are particularly preferable from the viewpoint of excellent copolymerizability.

Examples of the non-conjugated polyenes include:

non-conjugated dienes, such as dicyclopentadiene, 1,4-hexadiene, cyclooctadiene, methylenenorbornene, ethylidenenorbornene, vinylnorbornene, 4-methyl-1,4-hexadiene, 5-methyl-1,4-hexadiene, 4-ethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 7-methyl-1,6-decadiene, 6-ethyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene and 9-methyl-1,8-undecadiene; and non-conjugated trienes, such as 6,10-dimethyl-1,5,9-undecatriene, 4,8-dimethyl-1,4,8-decatriene, 5,9-dimethyl-1,4,8-decatriene, 6,9-dimethyl-1,5,8-decatriene, 6,8,9-trimethyl-1,5,8-decatriene, 6-ethyl-10-methyl-1,5,9-undecatriene, 4-ethylidene-1,6-octadiene, 7-methyl-4-ethylidene-1,6-octadiene, 4-ethylidene-8-methyl-1,7-nonadiene, 7-methyl-4-ethylidene-1,6-nonadiene, 7-ethyl-4-ethylidene-1,6-nonadiene, 6,7-dimethyl-4-ethylidene-1,6-octadiene, 6,7-dimethyl-4-ethylidene-1,6-nonadiene, 4-ethylidene-1,6-decadiene, 7-methyl-4-ethylidene-1,6-decadiene, 7-methyl-6-propyl-4-ethylidene-1,6-octadiene, 4-ethylidene-1,7-nonadiene, 8-methyl-4-ethylidene-1,7-nonadiene and 4-ethylidene-1,7-undecadiene.

Such non-conjugated polyenes are preferable from the viewpoint that they are excellent in abrasion resistance when crosslinked.

Of the above polyenes, 5-ethylidene-2-norbornene, 5-vinyl-2-norbornene, dicyclopentadiene (DCPD), 4,8-dimethyl-1,4,8-decatriene (DMDT) and 4-ethylidene-8-methyl-1,7-nonadiene (EMND) are desirable. Two or more kinds of the units (a-4) may be contained.

In the syndiotactic α-olefin-based copolymer (A), component units derived from an aromatic vinyl compound such as styrene, component units derived from the above polyene-based unsaturated compound (polyene) having two or more double bonds, component units derived from alcohol, carboxylic acid, amine and derivatives thereof, etc. may be contained.

The syndiotactic α-olefin-based copolymer (A) desirably has an intrinsic viscosity [η], as measured in decalin at 135° C., of usually 0.01 to 10 dl/g, preferably 0.05 to 10 dl/g. When the intrinsic viscosity [η] of the syndiotactic α-olefin-based copolymer (A) is in the above range, the syndiotactic α-olefin-based copolymer (A) is excellent in properties, such as weathering resistance, ozone resistance, heat aging resistance, low-temperature properties and dynamic fatigue resistance.

The syndiotactic α-olefin-based copolymer (A) has a single glass transition temperature, and the glass transition temperature Tg as measured by a differential scanning calorimeter (DSC) is desired to be usually not higher than −5° C., preferably not higher than −10° C., particularly preferably not higher than −15° C. When the glass transition temperature Tg of the syndiotactic α-olefin-based copolymer (A) is in the above range, the copolymer (A) is excellent in low-temperature resistance and low-temperature properties.

The syndiotactic α-olefin-based copolymer (A) has a molecular weight distribution (Mw/Mn, in terms of polystyrene, Mw: weight-average molecular weight, Mn: number-average molecular weight), as measured by GPC, of not higher than 4.0, preferably 1.5 to 3.0. When the molecular weight distribution is in this range, the polyolefin composition becomes excellent in scratch resistance, abrasion resistance and impact resistance, so that such a molecular weight distribution is preferable. Further, it is desirable that a melting peak measured by a differential scanning calorimeter (DSC) is not present. In this case, the polyolefin composition becomes excellent in flexibility, scratch resistance, abrasion resistance and impact resistance Preparation of Syndiotactic α-Olefin-Based Copolymer (A)

Such a syndiotactic structure α-olefin-based copolymer (A) can be obtained by copolymerizing propylene, ethylene and an α-olefin in the presence of a metallocene catalyst described below.

As such a metallocene catalyst, there can be mentioned at least one catalyst system comprising:
(x) a transition metal compound represented by the following formula (1), and
  (y) at least one compound selected from
  (y-1) a compound which reacts with a transition metal M in the above transition metal compound (a) to form an ionic complex,
  (y-2) an organoaluminum oxy-compound, and
  (y-3) an organoaluminum compound.

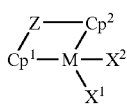

(1)

In the formula (1), M is Ti, Zr, Hf, Rn, Nd, Sm or R, $Cp^1$ and $Cp^2$ are each a cyclopentadienyl group, an indenyl group, a fluorenyl group or a derivative group thereof, said group being π-bonded to M, $X^1$ and $X^2$ are each an anionic ligand or a neutral Lewis base ligand, and Z is an atom of C, O, B, S, Ge, Si or Sn, or a group containing any of these atoms.

Of such transition metal compounds represented by the formula (1), preferable are transition metal compounds wherein $Cp^1$ and $Cp^2$ are groups different from each other, and more preferable are transition metal compounds wherein any one group of $Cp^1$ and $Cp^2$ is a cyclopentadienyl group or its derivative group and the other group is a fluorenyl group or its derivative group. Of these, transition metal compounds wherein any one group of Cp1 and Cp2 is a cyclopentadienyl group or its derivative group and the other group is a fluorenyl group or its derivative group are preferable.

In the present invention, such a metallocene catalyst as above is preferably used as a catalyst for preparing the syndiotactic α-olefin copolymer (A), but according to circumstances, a titanium catalyst comprising a solid titanium catalyst component and an organoaluminum compound or a vanadium catalyst comprising a soluble vanadium compound and an organoaluminum compound, said titanium or vanadium catalyst being a catalyst other than the above metallocene catalyst and hitherto publicly known, is also employable.

In the present invention, ethylene, propylene, and if necessary, an olefin and/or at least one polyene selected from conjugated polyenes and non-conjugated polyenes are copolymerized in the presence of such a metallocene catalyst as above usually in a liquid phase. In this case, a hydrocarbon solvent is generally used, but propylene may be used as a solvent. Copolymerization can be carried out by any of a batch process and a continuous process.

When the copolymerization is carried out by a batch process using the metallocene catalyst, the transition metal compound (x) is used in the polymerization system in an amount of usually 0.00005 to 1 mmol, preferably 0.0001 to 0.5 mmol, based on 1 liter of the polymerization volume.

The ionizing ionic compound (y-1) is used in such an amount that the molar ratio ((y-1)/(x)) of the ionizing ionic compound (y-1) to the transition metal compound (x) becomes 0.5 to 20, preferably 1 to 10.

The organoaluminum oxy-compound (y-2) is used in such an amount that the molar ratio (Al/M) of aluminum atom (Al) in the organoaluminum oxy-compound (y-2) to the transition metal atom (M) in the transition metal compound (x) becomes 1 to 10000, preferably 10 to 5000. The organoaluminum compound (y-3) is used in an amount of usually about 0 to 5 mmol, preferably about 0 to 2 mmol, based on 1 liter to the polymerization volume.

The copolymerization reaction is carried out under the conditions of a temperature of usually −20 to 150° C., preferably 0 to 120° C., more preferably 0 to 100° C., and a pressure of more than 0 but not more than 80 kg/cm², preferably more than 0 but not more than 50 kg/cm².

Although the reaction time (average residence time in the case where polymerization is carried out by a continuous process) varies depending upon the conditions such as catalyst concentration and polymerization temperature, it is in the range of usually 5 minutes to 3 hours, preferably 10 minutes to 1.5 hours.

Ethylene, propylene and an olefin are each fed to the polymerization system in such an amount that a syndiotactic α-olefin copolymer (A) having the aforesaid specific composition is obtained. In the copolymerization, a, molecular weight modifier such as hydrogen may be used. When ethylene, propylene and an α-olefin are copolymerized as above, the syndiotactic α-olefin copolymer (A) is obtained usually as a polymerization liquid containing it. This polymerization liquid is processed in a conventional way, whereby the syndiotactic α-olefin copolymer (A) is obtained.

Polyolefin Resin (B) (Other than Polybutene (C))

The polyolefin resin for use in the invention is an olefin polymer having crystallizability, and examples of suitable raw material olefins include ethylene, propylene, 1-butene, 1-pentene, 1-hexene, 1-octene, 1-decene, 2-methyl-1-propene, 3-methyl-1-pentene, 4-methyl-1-pentene and 5-methyl-1-hexene. These olefins are used singly or as a mixture of two or more kinds. Examples of such polyolefins include olefin homopolymers, such as polyethylene, polypropylene, polymethylpentene and polymethylbutene, and olefin copolymers, such as a propylene/ethylene random copolymer, but the polybutene (C) is not included. Of these, polypropylene, a propylene/ethylene random copolymer and a propylene/ethylene block copolymer are preferable, and in particular, polypropylene having a melt flow rate, as measured at 230° C. under a load of 2.16 kg, of 0.1 to 200 g/10 min is most preferable. The content of repeating units derived from propylene is preferably not less than 80% by mol. From the viewpoint of heat resistance, a polyolefin resin having a crystallinity, as determined by wide-angle X-ray diffractometry or the like, of not less than 5%, preferably not less than 20%, more preferably not less than 40%, is used.

As the polypropylene, any of isotactic polypropylene and syndiotactic polypropylene may be used.

Such thermoplastic resins as above may be used singly or may be used in combination of two or more kinds. Together with the above thermoplastic resins, other thermoplastic resins may be used.

Polybutene (C)

The polybutene (C) for use in the invention is a homopolymer of 1-butene or a copolymer of 1-butene and an olefin other than 1-butene. Examples of the olefins include ethylene, propylene, 1-pentene, 1-hexene, 1-octene, 1-decene, 2-methyl-1-propene, 3-methyl-1-pentene, 4-methyl-1-pentene and 5-methyl-1-hexene. These olefins are used singly or as a mixture of two or more kinds. Examples of such polyolefins include 1-butene/ethylene random copolymer, 1-butene/propylene random copolymer, 1-butene/methylpentene copolymer, 1-butene/methylbutene copolymer and 1-butene/propylene/ethylene copolymer. In such a copolymer, the 1-butene content is preferably not less than 50% by mol from the viewpoint of heat aging resistance. The polybutene (C) is preferably isotactic polybutene.

Ethylene-Based Copolymer Rubber (D)

The ethylene-based copolymer rubber (D) for use in the invention is an amorphous random elastomeric copolymer rubber consisting of ethylene and an α-olefin of 3 to 20 carbon atoms or an amorphous random elastomeric copolymer rubber consisting of ethylene, an α-olefin of 3 to 20 carbon atoms and a non-conjugated polyene.

In the ethylene-based copolymer (D), the molar ratio of ethylene to the α-olefin is in the range of usually 40/60 to 85/15, preferably 60/40 to 83/17.

Examples of the non-conjugated polyenes include dicyclopentadiene, 1,4-hexadiene, cyclooctadiene, methylenenorbornene, ethylidenenorbornene and vinylnorbornene. Of these, ethylene/propylene/non-conjugated diene copolymer rubbers and ethylene/1-butene/non-conjugated diene copolymer rubbers are preferable. In particular, ethylene/propylene/non-conjugated diene copolymer rubbers are preferable, and of these, an ethylene/propylene/ethylidenenorbornene copolymer rubber and an ethylene/propylene/vinylnorbornene copolymer rubber are particularly preferable.

The Mooney viscosity [ML1+4 (100° C.)] of the ethylene-based copolymer rubber (D) for use in the invention is desired to be in the range of 50 to 300, preferably 100 to 200.

The iodine value of the ethylene-based copolymer rubber (D) is in the range of preferably 3 to 30, particularly preferably 5 to 25.

The ethylene-based copolymer rubber (D) for use in the invention may be an oil-extended product containing a softener. As the softener employable in the oil-extended product, a softener usually used for rubbers can be employed.

Examples of the softeners include:

petroleum-based substances, such as process oil, lubricating oil, paraffin, liquid paraffin, petroleum asphalt and vaseline;

synthetic oils, such as low- or medium-molecular weight ethylene/α-olefin random copolymer;

coal tars, such as coal tar and coal tar pitch;

fatty oils, such as castor oil, linseed oil, rapeseed oil, soybean oil and coconut oil;

waxes, such as tall oil, beeswax, carnauba wax and lanolin;

fatty acids or metallic salts thereof, such as ricinolic acid, palmitic acid, stearic acid, barium stearate and calcium stearate;

synthetic high-molecular weight substances, such as petroleum resin, coumarone-indene resin and atactic polypropylene;

ester type plasticizers, such as dioctyl phthalate, dioctyl adipate and dioctyl sebacate; and others, such as microcrystalline wax, factice, liquid polybutadiene, modified liquid polybutadiene and liquid Thiokol.

Of these softeners, paraffinic process oil or low-molecular weight ethylene/α-olefin random copolymer is particularly preferable, and further, paraffinic process oil of high viscosity type having a low content of a low-molecular weight component that is easily evaporated is particularly preferable. The "high viscosity type" used herein means an oil having a dynamic viscosity at 40° C. of 100 to 10000 centistokes.

In the present invention, the softener is used in an amount of not more than 150 parts by weight, preferably 2 to 100 parts by weight, more preferably 5 to 60 parts by weight, based on 100 parts by weight of the ethylene-based copolymer rubber (D).

Other Components

In addition to the syndiotactic α-olefin-based copolymer (A), the polyolefin resin (B), the polybutene (C) and the ethylene-based copolymer rubber (D), other thermoplastic resins can be added in the invention within limits not detrimental to the merits of the polyolefin composition of the invention. As the other thermoplastic resins, thermoplastic resins having a melting point of not lower than 50° C., preferably not lower than 80° C., can be used without any restriction, and when a clear melting point is not present, thermoplastic resins having a glass transition temperature of not lower than 40° C., preferably not lower than 80° C., can be used without any restriction. Examples of such thermoplastic resins include crystalline thermoplastic resins, such as polyamide, polyester, polyacetal, soft polyvinyl chloride, polyamide elastomer, polester elastomer and polyurethane elastomer, and non-crystalline thermoplastic resins, such as polystyrene, acrylonitrile/butadiene/styrene copolymer (ABS), polycarbonate and polyphenylene oxide.

In the present invention, not only the ethylene-based copolymer rubber (D) but also a combination of the ethylene-based copolymer rubber (D) and a rubber other than the ethylene-based copolymer rubber (D) can be used within limits not detrimental to the object of the present invention. Examples of such rubbers other than the ethylene-based copolymer rubber (D) include propylene/ethylene copolymer rubber (propylene content: not less than 60% by mol), propylene/α-olefin copolymer rubber, styrene/butadiene rubber and its hydrogenation product, styrene/isoprene rubber and its hydrogenation product, polybutadiene rubber, polyisoprene rubber, nitrile rubber, butyl rubber, polyisobutylene rubber, natural rubber and silicone rubber.

In the polyolefin composition of the invention, a softener and/or an inorganic filler may be blended in addition to the syndiotactic α-olefin-based copolymer (A), the polyolefin resin (B) (other than polybutene (C)), the polybutene (C) and the ethylene-based copolymer rubber (D).

The softener may be used for oil-extending the ethylene-based copolymer rubber (D), as previously described, or may be added later without oil-extending the ethylene-based copolymer rubber (D). Also in the case where the softener is added later without oil-extending the ethylene-based copolymer rubber (D), the same softener as previously described can be employed.

In the case where the softener is added later without oil-extending the ethylene-based copolymer rubber (D), the amount of the softener including the oil-extending portion is not more than 100 parts by weight, preferably 3 to 80 parts by weight, more preferably 5 to 50 parts by weight, based on 100 parts by weight of the total amount of the syndiotactic α-olefin-based copolymer (A), the polyolefin resin (B) (other than polybutene (C)), the polybutene (C) and the ethylene-based copolymer rubber (D) that is used when needed. When the softener is used in the above amount, the resulting composition is excellent in flowability in the molding process, and mechanical properties of a molded product of the composition are not lowered. If the amount of the softener used in the invention exceeds 100 parts by weight, heat resistance of the resulting composition tends to be lowered.

Examples of the inorganic fillers employable in the invention include calcium carbonate, calcium silicate, clay, kaolin, talc, silica, diatomaceous earth, mica powder, asbestos, alumina, barium sulfate, aluminum sulfate, calcium sulfate, basic magnesium carbonate, molybdenum disulfide, graphite, glass fiber, glass bulb, Shirasu balloon, basic magnesium sulfate whisker, calcium titanate whisker and aluminum borate whisker.

In the present invention, the inorganic filler is used in an amount of not more than 100 parts by weight, preferably 2 to 30 parts by weight, based on 100 parts by weight of the total amount of the syndiotactic α-olefin-based copolymer (A), the polyolefin resin (B) (other than polybutene (C)), the polybutene (C) and the ethylene-based copolymer rubber (D) that is used when needed. If the amount of the inorganic filler used in the invention exceeds 100 parts by weight, elastomeric properties and molding processability of the resulting composition tend to be lowered.

To the polyolefin composition of the invention can be further added additives hitherto publicly known, such as heat stabilizer, anti-aging agent, weathering stabilizer, antistatic agent, crystal nucleating agent and lubricant, within limits not detrimental to the object of the present invention. In particular, the lubricant contributes to further enhancing scratch resistance and abrasion resistance of the resulting polyolefin composition, and examples of the lubricants include higher fatty acid amide, metallic soap, wax, silicone oil and fluorine-based polymer. Above all, higher fatty acid amide, silicone oil or fluorine-based polymer is used in the polyolefin composition of the invention. Examples of the higher fatty acid amides include saturated fatty acid amides, such as lauric acid amide, palmitic acid amide, stearic acid amide and behenic acid amide; unsaturated fatty acid amides, such as erucic acid amide, oleic acid amide, brassidic acid amide and elaidic acid amide; and bisfatty acid amides, such as methylenebisstearic acid amide, methylenebisoleic acid amide, ethylenebisstearic acid amide and ethylenebisoleic acid amide. Examples of the silicone oils include dimethyl silicone oil, phenylmethyl silicone oil, alkyl silicone oil, fluorosilicone oil, tetramethyl tetraphenyl trisiloxane and modified silicone oil. Specifically, polytetrafluoroethylene, vinylidene fluoride copolymer, etc. can be mentioned. Of these, preferable are erucic acid amide, oleic acid amide, ethylenebisoleic acid amide, dimethyl silicone oil, phenylmethyl silicone oil, alkyl silicone oil, polytetrafluoroethylene and vinylidene fluoride copolymer, and particularly preferable are erucic acid amide, oleic acid amide, dimethyl silicone oil and vinylidene fluoride copolymer.

Polyolefin Composition

The polyolefin composition of the invention is obtained by mixing the syndiotactic α-olefin-based copolymer (A), the polyolefin resin (B) (other than polybutene (C)), the polybutene (C), the ethylene-based copolymer rubber (D) that is used when needed, and the softener and/or the inorganic filler that is blended when needed, and/or the additives, then dynamically heat-treating the mixture to obtain a composition and molding the composition into a desired shape. The expression "dynamically heat-treating" used herein means that the mixture is kneaded in a molten state.

All the components may be dynamically heat-treated at once; or it is also possible that two or more of the syndiotactic α-olefin-based copolymer (A), the polyolefin resin (B) (other than polybutene (C)), the polybutene (C) and the ethylene-based copolymer rubber (D) that is used when needed are dynamically heat-treated in advance together with the softener and/or the inorganic filler that is blended when needed, and/or the additives, then one or more of the syndiotactic α-olefin-based copolymer (A), the polyolefin resin (B) (other than polybutene (C)), the polybutene (C) and the ethylene-based copolymer rubber (D) that is used when needed, and the softener and/or the inorganic filler that is blended when needed, and/or the additives are added, and they are dynamically heat-treated again.

In the case where the dynamic heat treatment is carried out in the presence of a crosslinking agent, the ethylene-based copolymer rubber (D) can be crosslinked. By crosslinking the ethylene-based copolymer rubber (D), heat resistance of the interior trim skin according to the invention is improved. By carrying out the dynamic heat treatment in the presence of a crosslinking agent, the syndiotactic α-olefin-based copolymer (A) can be also crosslinked. By crosslinking the syndiotactic α-olefin-based copolymer (A), heat resistance of the interior trim skin according to the invention is improved. In particular, because the syndiotactic α-olefin-based copolymer (A) contains the units (a-4), crosslinking efficiency is enhanced, and this contributes to enhancement of heat resistance and elastomeric properties.

Examples of the crosslinking agents used in the above case include crosslinking agents generally used for thermosetting type rubbers, such as organic peroxide, phenolic resin, sulfur, hydrosilicone compound, amino resin, quinone or its derivative, amine compound, azo compound, epoxy compound and isocyanate. Of these crosslinking agents, organic peroxide is particularly preferable.

Examples of the organic peroxides for use in the invention include dicumyl peroxide, di-tert-butyl peroxide, 2,5-dimethyl-2,5-di-(tert-butylperoxy)hexane, 2,5-dimethyl-2,5-di-(tert-butylperoxy)hexyne-3,1,3-bis(tert-butylperoxyisopropyl)benzene, 1,1-bis(tert-butylperoxy)-3,3,5-trimethylcyclohexane, n-butyl-4,4-bis(tert-butylperoxy) valerate, benzoyl peroxide, p-chlorobenzoyl peroxide, 2,4-dichlorobenzoyl peroxide, tert-butyl peroxybenzoate, tert-butyl perbenzoate, tert-butylperoxyisopropyl carbonate, diacetyl peroxide, lauroyl peroxide and tert-butylcumyl peroxide.

Of these, bifunctional organic peroxides, such as 2,5-dimethyl-2,5-di-(tert-butylperoxy)hexane, 2,5-dimethyl-2,5-di-(tert-butylperoxy)hexyne-3 and 1,3-bis(tert-butylperoxyisopropyl)benzene, are particularly preferable from the viewpoints of reactivity, odor and scorch stability. Of these, 2,5-dimethyl-2,5-di-(tert-butylperoxy)hexane is most preferable.

Such an organic peroxide is used in an amount of 0.02 to 3 parts by weight, preferably 0.05 to 1 part by weight, based on 100 parts by weight of the whole substance to be treated.

In the crosslinking treatment with the organic peroxide in the invention, a peroxy crosslinking assistant, such as sulfur, p-quinonedioxime, p,p'-dibenzoyl quinonedioxime, N-methyl-N-4-dinitrosoaniline, nitrosobenzene, diphenylguanidine or trimethylolpropane-N,N'-m-phenylenedimaleimide, or a polyfunctional methacrylate monomer, such as divinylbenzene, triallyl cyanurate, ethylene glycol dimethacrylate, diethylene glycol dimethacrylate, polyethylene glycol dimethacrylate, trimethylolpropane trimethacrylate or allyl methacrylate, or a polyfunctional vinyl monomer, such as vinyl butyrate or vinyl stearate, can be blended.

By the use of such a compound as above, uniform and mild crosslinking reaction can be expected. In particular, divinylbenzene is most preferable in the invention. Divinylbenzene is easy to handle, and it has excellent compatibility with the syndiotactic α-olefin-based copolymer (A) that is a main component of the above substance to be crosslinked, the polyolefin resin (B) (other than polybutene (C)) and the ethylene-based copolymer rubber (D). Moreover, divinylbenzene has a function of solubilizing the organic peroxide and serves as a dispersant for the organic peroxide. Hence, the crosslinking effect due to heat treatment is homogeneous, and a composition having a good balance between flowability and other properties is obtained.

The compound, such as the above crosslinking assistant or polyfunctional vinyl monomer, is used in an amount of usually not more than 5 parts by weight, preferably 0 to 3 parts by weight, more preferably 0.2 to 3 parts by weight, particularly preferably 0.3 to 3 parts by weight, based on 100 parts by weight of the substance to be treated.

In order to accelerate decomposition of the organic peroxide, a decomposition accelerator, e.g., tertiary amine, such as triethylamine, tributylamine or 2,4,6-tri(dimethylamino)phenol, or naphthenic acid salt of aluminum, cobalt, vanadium, copper, calcium, zirconium, manganese, magnesium, lead, mercury or the like, may be used.

The dynamic heat treatment in the invention is preferably carried out in a non-open type apparatus and is preferably carried out in an atmosphere of an inert gas such as nitrogen or carbonic acid gas. The temperature of the heat treatment is in the range of a melting point of the polyolefin resin (B) to 300° C. and is in the range of usually 150 to 290° C., preferably 170 to 270° C. The kneading time is in the range of usually 1 to 20 minutes, preferably 1 to 10 minutes. The shear force applied is in the range of 10 to 10,000 sec$^{-1}$, preferably 100 to 5,000 sec$^{-1}$, in terms of shear rate.

Although a mixing roll, an intensive mixer (e.g., Banbury mixer, kneader), a single-screw or twin-screw extruder or the like can be used as the kneading apparatus, a non-open type apparatus is preferable.

After the above dynamic heat treatment, the composition is desired to be statically heat-treated with hot air. The heat treatment is preferably carried out at 80 to 130° C. for about 1 to 10 hours. By this heat treatment, residues of the crosslinking agent, etc. can be removed, and odor of the resulting article can be reduced, or an article excellent in fogging properties can be obtained.

Preferred uses of the polyolefin composition of the invention are specifically as follows.

Automobile Interior Trim Parts (i) Instrument panel skin, door skin, ceiling skin, console skin, etc. obtained by vacuum forming or stamping of a sheet molded product that is obtained by extrusion molding or calendering the composition of the invention.

(ii) Instrument panel skin, door skin, ceiling skin, ceiling skin and console skin, etc. obtained by pulverizing the composition of the invention into a powder having a particle diameter of not more than 1.0 mm and subjecting the powder to powder slush molding.

(iii) Various skins obtained by injection molding of the composition of the invention, such as handle skin, console skin, armrest skin, shift knob skin, parking lever grip skin, assist grip skin and seat adjustment grip skin. In this case, a substrate of an olefin-based resin and the skin of the invention can be integrally produced by successive injection molding or simultaneous injection molding of the composition and the olefin-based resin such as polypropylene.

Automobile Seal Parts

Examples of the automobile seal parts according to the invention include the following ones.

(i) Side molding, bumper molding, roof molding, window molding, glass run channel, weatherstrip molding, belt molding, etc. obtained by single layer extrusion molding.

(ii) Side molding, bumper molding, roof molding, window molding, glass run channel, weatherstrip molding, belt molding, etc. obtained by multilayer lamination extrusion molding of the composition and other materials. In this case, the composition of the invention is used for parts requiring at least scratch resistance and abrasion resistance.

(iii) Main bodies, end parts and corner parts of side molding, bumper molding, roof molding, window molding, glass run channel, weatherstrip molding, belt molding, etc., which are obtained by injection molding.

EXAMPLES

Polymerization Example 1

Preparation of Syndiotactic Propylene/Butene/Ethylene Random Copolymer (A-1)

In a 2000 ml polymerization apparatus thoroughly purged with nitrogen, 100 ml of dry hexane, 480 g of 1-butene and triisobutylaluminum (1.0 mmol) were placed at ordinary temperature. Then, the internal temperature of the polymerization apparatus was raised to 35° C., and the polymerization apparatus was pressurized to 0.54 MPa with propylene and then pressurized to 0.62 MPa with ethylene. Thereafter, a toluene solution in which 0.005 mmol of diphenylmethylene (cyclopentadienyl)fluorenyl zirconium dichloride and 1.5 mmol (in terms of aluminum) of methylaluminoxane (available from Tosoh Finechem Corporation) had been contacted was introduced into the polymerizer. With maintaining the internal temperature at 35° C. and the ethylene pressure at 0.62 MPa, polymerization was carried out for 5 minutes, and 20 ml of methanol was added to terminate polymerization. After the pressure was released, a polymer was precipitated from the polymer solution in 2 liters of methanol, and the polymer was dried under vacuum at 130° C. for 12 hours. The amount of the polymer obtained was 36.1 g. The polymer had composition of a propylene content of 61.3% by mol, an ethylene content of 10.3% by mol and a 1-butene content of 28.4% by mol, and the polymer had an intrinsic viscosity [η] of 2.67 dl/g and a glass transition temperature Tg of −27.7° C. Further, any melting peak was not present, and the molecular weight distribution as determined by GPC was 2.0. As for the absorptions of methyl groups of propylene units in $^{13}$C-NMR of the polymer measured in a 1,2,4-trichlorobenzene solution, the sum total of absorption intensities observed at about 20.0 to 21.0 ppm on the basis of tetramethylsilane was 0.8 of the absorption intensities at about 19.0 to 22.0 ppm assigned to propylene methyl.

Polymerization Example 2

Preparation of Syndiotactic Propylene/Ethylene Random Copolymer (A-2)

In a 1.5-liter autoclave vacuum dried and purged with nitrogen, 750 ml of heptane was placed at ordinary temperature, then 0.3 ml of a toluene solution (1.0 mmol/ml) of triisobutylaluminum was added so that its amount would become 0.3 mmol in terms of aluminum atom, and 50.7 liters of propylene were introduced (25° C., 1 atm) with stirring. Then, temperature rise was started, and a temperature of 30° C. was reached. Thereafter, the system was pressurized to 5.5 kg/cm$^2$G with ethylene, and 3.75 ml of a heptane solution (0.0002 mmol/ml) of diphenylmethylene(cyclopentadienyl)(fluorenyl)zirconium dichloride synthesized by a publicly known process and 2.0 ml of a toluene solution (0.002 mmol/ml) of triphenylcarbenium tetra(pentafluorenyl)borate were added to initiate copolymerization of propylene and ethylene. As for the catalyst concentration at this time, the diphenylmethylene(cyclopentadienyl)(fluorenyl)zirconium dichloride concentration in the whole system was 0.001 mmol/liter, and the triphenylcarbenium tetra(pentafluorenyl)borate concentration in the whole system was 0.004 mmol/liter.

During the polymerization, ethylene was continuously fed to maintain the internal pressure at 5.5 kg/cm$^2$G. After 30 minutes from the initiation of polymerization, methanol was added to terminate polymerization reaction. After the pressure was released, the polymer solution was withdrawn, and the polymer solution was washed by using an "aqueous solution obtained by adding 5 ml of concentrated hydrochloric acid based on 1 liter of water" in a ratio of 1:1 (aqueous solution:polymer solution) to transfer the catalyst residue into the aqueous phase. After this catalyst mixed solution was allowed to stand still, the aqueous phase was separated and removed, and the remainder was further washed with distilled water twice to subject the polymerization liquid phase to oil-water separation. The polymerization liquid phase having been subjected to oil-water separation was contacted with acetone in an amount of 3 times as much as the polymerization liquid phase with vigorous stirring, to precipitate a polymer. Then, the polymer was sufficiently washed with acetone, and the solid part (copolymer) was collected by filtration. The solid part was dried at 130° C. and 350 mmHg for 12 hours in a stream of nitrogen.

The propylene/ethylene copolymer obtained as above had an intrinsic viscosity [η], as measured in decalin at 135° C., of 2.4 dl/g, a SP value of 0.94, a glass transition temperature of −28° C., an ethylene content of 24% by mol, and a molecular weight distribution (Mw/Mn), as measured by GPC, of 2.9.

Example 1

70 Parts by weight of the syndiotactic propylene/butene/ethylene random copolymer (A-1) obtained in Polymerization Example 1, 20 parts by weight of isotactic polypropylene (B-1) (homopolymer, MFR (230° C., load of 2.16 kg, the same measuring conditions shall apply hereinafter): 0.5 g/10 min), 10 parts by weight of a 1-butene homopolymer (C-1) (MFR: 2.0 g/10 min), 2 parts by weight of a carbon black masterbatch (for coloring the resulting composition black, the same shall apply hereinafter) and 2 parts by weight of a silicone oil (available from Dow Corning Toray Silicon Co., Ltd., trade name: SH100 (100 cs)) were stirred and mixed by a batch type high-speed mixer and then kneaded by a twin-screw extruder whose highest temperature had been set at 230° C., to obtain pellets of a composition (I).

The resulting pellets of the composition (I) were extruded by a sheet extrusion molding machine equipped with a T-die having been set at a die temperature of 210° C., and passed between an embossing roll (roll temperature: 90° C.) placed just behind the die and a pinch roll to obtain an embossed sheet. The thickness of the embossed sheet was 0.5 mm, and the maximum depth of the embossed pattern was 180 μm. This embossed sheet was subjected to positive vacuum forming using an instrument panel mold under the conditions of a sample temperature of 145° C. The resulting form had no problem with its appearance and had good appearance.

Using a Japan Society for the Promotion of Science-type abrasion tester (manufactured by Toyo Seiki Seisaku-Sho, Ltd.), a test specimen of 2 mm thickness obtained from the sheet having been subjected to no vacuum forming was abraded with a 45R abrasion indenter of 470 g made of SUS, whose tip had been covered with a cotton canvas of #10, under the conditions of 23° C., a number of reciprocating abrasion times of 100, a reciprocating abrasion rate of 33 times/min and a stroke of 100 mm, and a change in gloss after the abrasion was determined in the following manner.

Change in gloss=gloss before abrasion−gloss after abrasion

The change in gloss under the above conditions was 4%.

Further, from the pellets of the composition (I), a grip was produced under the same injection molding conditions as above. On the resulting grip, a cotton canvas having a width of 3 cm was hung, and the grip was subjected to an abrasion test of 300 reciprocating abrasion times under a load of 300 g, as shown in the figure. A change after the test was visually observed and evaluated by the following criteria.

5 points: No scratch was observed.
4 points: A scratch was slightly observed.
3 points: A scratch was apparently observed.
2 points: The surface was scraped and abraded.
1 point: The surface was markedly abraded.
The above grip scored 5 points.

Furthermore, the embossed sheet was placed in a Geer oven at 110° C. for 24 hours and taken out, then the gloss of the sheet was compared with the gloss value measured before the sheet was placed in the Geer oven, and a change in gloss due to heat aging was determined in the following manner.

Change in gloss=gloss before heat treatment−gloss after heat treatment

The change in gloss was 2%.

Example 2

In a Henschel mixer, 40 parts by weight of isotactic polypropylene (homopolymer, MFR: 12 g/10 min), 60 parts by weight of pellets of an oil-extended product of an ethylene/propylene/5-ethylidene-2-norbornene copolymer rubber (EPDM (D-1), oil extension quantity: 40 parts by weight, oil: mineral oil-based paraffin oil, Mooney viscosity ML1+4 (100° C.): 80, ethylene content: 79% by mol, iodine value: 11), 0.2 part by weight of 2,5-dimethyl-2,5-di(tert-butylperoxy)hexane as a crosslinking agent (POX) and 0.3 part by weight of divinylbenzene (DVB) as a crosslinking assistant were sufficiently stirred and mixed, and the mixture was fed to a twin-screw extruder set at 160° C. to 220° C. and subjected to dynamic crosslinking to prepare pellets of a crosslinked thermoplastic elastomer (TPV-1). From 40 parts by weight of the pellets of this TPV-1, 30 parts by weight of the syndiotactic propylene/butene/ethylene random copolymer (A-1) obtained in Polymerization Example 1, 20 parts by weight of an isotactic propylene/ethylene random copolymer (B-2) (MFR: 10 g/10 min, ethylene content: 2.5% by mol), 10 parts by weight of a 1-butene homopolymer (C-1), 2 parts by weight of a carbon black masterbatch and 2 parts by weight of a silicone oil (the same as that in Example 1), pellets of a composition (II) were obtained in the same manner as in Example 1.

From the resulting pellets of the composition (II), an embossed square plate was produced by the use of an injection molding machine (M-150 manufactured by Meiki Co., Ltd., cylinder preset temperature: 220° C.). Moldability and appearance of the embossed square plate were good. Before and after the abrasion test of the Japan Society for the Promotion of Science, gloss was measured in the same manner as in Example 1. The change in gloss was 7%.

Further, from the pellets of the composition (II), a grip was produced under the same injection molding conditions as in Example 1, and the grip was subjected to a reciprocating abrasion test. A change after the test was evaluated in the same manner as in Example 1.

The above grip scored 4 points.

Furthermore, the embossed square plate was placed in a Geer oven at 110° C. for 24 hours similarly to Example 1, and a change in gloss due to heat aging was determined.

The change in gloss was 1%.

Example 3

From 70 parts by weight of the syndiotactic propylene/ethylene random copolymer (A-2) obtained in Polymerization Example 2, 20 parts by weight of isotactic polypropylene (B-1), 10 parts by weight of a 1-butene homopolymer (C-1), 2 parts by weight of a carbon black masterbatch and 2 parts by weight of a silicone oil (the same as that in Example 1), pellets of a composition (III) were obtained in the same manner as in Example 1.

From the resulting pellets of the composition (III), an embossed-sheet was produced in the same manner as in Example 1, and the embossed sheet was subjected to positive vacuum forming. The resulting form had no problem with its appearance and had good appearance.

Using the sheet having been subjected to no vacuum forming, an abrasion test of the Japan Society for the Promotion of Science was carried out in the same manner as in Example 1, and a change in gloss after the test was determined.

The change in gloss under the above conditions was 5%.

Further, from the pellets of the composition (III), a grip was produced under the same injection molding conditions as in Example 1, and the grip was subjected to a reciprocating abrasion test. A change after the test was evaluated in the same manner as in Example 1.

The above grip scored 5 points.

Furthermore, a change in gloss due to heat aging was determined in the same manner as in Example 1.

The change in gloss was 2%.

Example 4

To 40 parts by weight of the syndiotactic propylene/ethylene random copolymer (A-2) obtained in Polymerization Example 2, 20 parts by weight of isotactic polypropylene (B-1), 10 parts by weight of a 1-butene homopolymer (C-1), 30 parts by weight of EPDM (D-1), 2 parts by weight of a carbon black masterbatch and 2 parts by weight of a silicone oil (the same as that in Example 1) were added 0.2 part by weight of 2,5-dimethyl-2,5-di(tert-butylperoxy)hexane (POX-1) as a crosslinking agent and 0.2 part by weight of divinylbenzene (DVB) as a crosslinking assistant, and they were sufficiently stirred and mixed in a Henschel mixer. The mixture was fed to a twin-screw extruder set at 160° C. to 220° C. and subjected to dynamic crosslinking to obtain pellets of a composition (IV).

From the resulting composition (IV), an embossed sheet was produced in the same manner as in Example 1, and the embossed sheet was subjected to positive vacuum forming. The resulting form had no problem with its appearance and had good appearance.

Using the sheet having been subjected to no vacuum forming, an abrasion test of the Japan Society for the Promotion of Science was carried out in the same manner as in Example 1, and a change in gloss after the test was determined.

The change in gloss under the above conditions was 7%.

Further, a change in gloss due to heat aging was determined in the same manner as in Example 1.

The change in gloss was 2%.

Example 5

From 40 parts by weight of the pellets of TPV-1 obtained in Example 2, 30 parts by weight of the syndiotactic propylene/butene/ethylene random copolymer (A-1), 10 parts by weight of an isotactic propylene/ethylene random copolymer (B-2) (MFR: 10 g/10 min, ethylene content: 2.5% by mol), 10 parts by weight of a syndiotactic homopolymer (B-3) (MFR: 1 g/10 min), 10 parts by weight of a 1-butene homopolymer (C-1), 2 parts by weight of a carbon black masterbatch and 2 parts by weight of a silicone oil (the same as that in Example 1), pellets of a composition (V) were obtained in the same manner as in Example 1.

From the resulting pellets of the composition (V), an embossed sheet was produced in the same manner as in Example 1, and the embossed sheet was subjected to positive vacuum forming. The resulting form had no problem with its appearance and had good appearance.

Using the sheet having been subjected to no vacuum forming, an abrasion test of the Japan Society for the Promotion of Science was carried out in the same manner as in Example 1, and a change in gloss after the test was determined.

The change in gloss under the above conditions was 6%.

Further, a change in gloss due to heat aging was determined in the same manner as in Example 1.

The change in gloss was 1%.

Furthermore, from the pellets of the composition (VI), a grip was produced under the same injection molding conditions as in Example 1, and the grip was subjected to a reciprocating abrasion test. A change after the test was evaluated in the same manner as in Example 1.

The above grip scored 4 points.

Comparative Example 1

From 70 parts by weight of the syndiotactic propylene/ethylene random copolymer (A-1) obtained in Polymerization Example 1, 30 parts by weight of isotactic polypropylene (B-1), 2 parts by weight of a carbon black masterbatch and 2 parts by weight of a silicone oil (the same as that in Example 1), pellets of a composition (VI) were obtained in the same manner as in Example 1.

From the resulting composition (VI), an embossed sheet was produced in the same manner as in Example 1, and the embossed sheet was subjected to positive vacuum forming. The resulting form had no problem with its appearance and had good appearance.

Using the sheet having been subjected to no vacuum forming, an abrasion test of the Japan Society for the Promotion of Science was carried out in the same manner as in Example 1, and a change in gloss after the test was determined.

The change in gloss under the above conditions was 5%.

Further, from the pellets of the composition (VI), a grip was produced under the same injection molding conditions as in Example 1, and the grip was subjected to a reciprocating abrasion test. A change after the test was evaluated in the same manner as in Example 1.

The above grip scored 4 points.

Furthermore, a change in gloss due to heat aging was determined in the same manner as in Example 1.

The change in gloss was 7%.

Comparative Example 2

From 40 parts by weight of the pellets of the crosslinked thermoplastic elastomer (TPV-1) used in Example 2, 30 parts by weight of the syndiotactic propylene/butene/ethylene random copolymer (A-1), 30 parts by weight of an isotactic propylene/ethylene random copolymer (B-2), 2 parts by weight of a carbon black masterbatch and 2 parts by weight of a silicone oil (the same as that in Example 1), pellets of a composition (VII) were obtained in the same manner as in Example 1.

From the resulting pellets of the composition (VII), an embossed square plate was produced by the use of an injection molding machine similarly to Example 2. Moldability and appearance of the embossed square plate were good. Before and after the abrasion test of the Japan Society for the Promotion of Science, gloss was measured in the same manner as in Example 1. The change in gloss was 8%.

Further, from the pellets of the composition (VII), a grip was produced under the same injection molding conditions as in Example 1, and the grip was subjected to a reciprocating abrasion test. A change after the test was evaluated in the same manner as in Example 1.

The above grip scored 4 points.

Furthermore, the embossed square plate was placed in a Geer oven at 110° C. for 24 hours similarly to Example 2, and a change in gloss due to heat aging was determined. The change in gloss was 9%.

Comparative Example 3

From 70 parts by weight of an existing propylene/butene/ethylene copolymer having an isotactic structure (intrinsic viscosity [η] as measured in decalin at 135° C.: 2.5 dl/g, propylene content: 62% by mol, ethylene content: 10% by mol, 1-butene content: 28% by mol, molecular weight distribution (Mw/Mn) as measured by GPC: 2.2), 20 parts by weight of isotactic polypropylene (B-1), 10 parts by weight of a 1-butene homopolymer (C-1), 2 parts by weight of a carbon black masterbatch and 2 parts by weight of a silicone oil (the same as that in Example 1), pellets of a composition (VIII) were obtained in the same manner as in Example 1.

From the resulting composition (VIII), an embossed sheet was produced in the same manner as in Example 1, and the embossed sheet was subjected to positive vacuum forming. As for the appearance of the resulting form, embossed patterns almost eliminated were found here and there, and the appearance was bad.

Using the sheet having been subjected to no vacuum forming, an abrasion test of the Japan Society for the Promotion of Science was carried out in the same manner as in Example 1, and a change in gloss after the test was determined.

The change in gloss under the above conditions was 58%.

Further, from the pellets of the composition (VIII), a grip was produced under the same injection molding conditions as in Example 1, and the grip was subjected to a reciprocating abrasion test. A change after the test was evaluated in the same manner as in Example 1.

The above grip scored 3 points.

Furthermore, a change in gloss due to heat aging was determined in the same manner as in Example 1.

The change in gloss was 2%.

The results of Examples 1 to 5 and Comparative Example 1 to 3 are set forth in Table 1.

TABLE 1

|  | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|
| Syndiotactic propylene/butene/ethylene random copolymer (A-1) | 70 | 30 |  |  | 30 | 70 | 30 |  |
| Syndiotactic propylene/ethylene random copolymer (A-2) |  |  | 70 | 40 |  |  |  |  |
| Isotactic propylene/butene/ethylene random copolymer (A-3) |  |  |  |  |  |  |  | 70 |
| Isotactic propylene homopolymer (B-1) | 20 |  | 20 | 20 | 10 | 30 |  | 20 |
| Isotactic propylene/ethylene random copolymer (B-2) |  | 20 |  |  |  |  | 30 |  |
| Syndiotactic propylene homopolymer (B-3) |  |  |  |  | 10 |  |  |  |
| 1-Butene homopolymer (C-1) | 10 | 10 | 10 | 10 | 10 |  |  | 10 |
| EPDM (D-1) |  |  |  | 30 |  |  |  |  |
| TPV-1 |  | 40 |  |  | 40 |  | 40 |  |
| Carbon black masterbatch | 2 | 2 | 2 | 2 | 2 | 2 | 2 | 2 |
| Silicone oil | 2 | 2 | 2 | 2 | 2 | 2 | 2 | 2 |
| POX-1 |  |  |  | 0.2 |  |  |  |  |
| DVB |  |  |  | 0.2 |  |  |  |  |
| Sheet extrusion moldability (T-die extrusion) | AA | — | AA | AA | AA | AA | — | AA |
| Vacuum formability | AA | — | AA | AA | AA | AA | — | BB |
| Injection moldability | — | AA | — | — | — | — | AA | — |
| Abrasion test of the Japan Society for the Promotion of Science, Change in gloss (%) | 4 | 7 | 5 | 7 | 6 | 5 | 8 | 58 |
| Abrasion test by cotton canvas (point(s)) | 5 | 4 | 5 | — | 4 | 4 | 4 | 3 |
| Heat aging resistance, Change in gloss (%) | 2 | 1 | 2 | 2 | 1 | 7 | 9 | 2 |

AA: good,
BB: bad

INDUSTRIAL APPLICABILITY

According to the present invention, a polyolefin composition excellent in scratch resistance, abrasion resistance, heat aging resistance and processability into parts can be proposed.

The invention claimed is:

1. A polyolefin composition comprising:
(A) a syndiotactic α-olefin-based copolymer,
(B) a polyolefin resin selected from the group consisting of polypropylene, a propylene/ethylene random copolymer and a propylene/ethylene block copolymer, and
(C) polybutene,
wherein the syndiotactic α-olefin-based copolymer (A) has properties that regarding absorptions of methyl groups of propylene units in $^{13}$C-NMR of the copolymer (A) measured in a 1,2,4-trichlorobenzene solution, the sum total of absorption intensities of peaks observed at 20.0 to 21.0 ppm on the basis of tetramethylsilane is not less than 0.5 of the absorption intensities at 19.0 to 22.0 ppm assigned to all the methyl groups of propylene;
the copolymer (A) comprises:
(a-1) repeating units derived from propylene,
(a-2) repeating units derived from ethylene,
and if necessary,
(a-3) repeating units derived from an olefin of 4 to 20 carbon atoms, and/or
(a-4) repeating units derived from at least one polyene selected from conjugated polyenes and non-conjugated polyenes;
the copolymer (A) contains
the units (a-1) in amounts of 30 to 79% by mol,
the units (a-2) in amounts of 1 to 30% by mol,
the units (a-3) in amounts of 0 to 50% by mol,
(with the proviso that the units (a-2) and the units (a-3) are contained in the total amount of 21 to 70% by mol in 100% by mol of the total amount of the units (a-1), the units (a-2) and the units (a-3)), and
the units (a-4) in amounts of 0 to 30% by mol based on 100% by mol of the total amount of the units (a-1), the units (a-2) and the units (a-3)); and
the copolymer (A) substantially has a syndiotactic structure; and
wherein the polyolefin resin (B) is either syndiotactic or isotactic, which has a content of repeating units derived from propylene of not less than 80% by mol.

2. The polyolefin composition as claimed in claim 1, wherein the syndiotactic α-olefin-based copolymer (A) is blended in an amount of 1 to 98 parts by weight, the polyolefin resin (B) is blended in an amount of 98 to 1 part by weight, and the polybutene (C) is blended in an amount of 1 to 70 parts by weight, with the proviso that the total amount of the components (A), (B) and (C) is 100 parts by weight.

3. The polyolefin composition as claimed in claim 1, further comprising an ethylene-based copolymer rubber (D).

4. The polyolefin composition as claimed in claim 3, wherein the ethylene-based copolymer rubber (D) is blended in an amount of 5 to 1000 parts by weight based on 100 parts by weight of the total amount of the syndiotactic α-olefin-based copolymer (A), the polyolefin resin (B) and the polybutene (C).

5. The polyolefin composition as claimed in claim 3, wherein the ethylene-based copolymer rubber (D) has been crosslinked.

6. The polyolefin composition as claimed in claim 1, wherein the syndiotactic α-olefin-based copolymer (A) does not have a melting peak measured by a differential scanning calorimeter (DSC) and has an intrinsic viscosity [η], as measured in decalin at 135° C., of 0.01 to 10 dl/g, a molecular weight distribution (Mw/Mn), as determined by GPC, of not more than 4 and a glass transition temperature (Tg) of not higher than −5° C.

7. The polyolefin composition as claimed in claim 1, wherein the syndiotactic α-olefin-based copolymer (A) has been crosslinked.

8. The polyolefin composition as claimed in claim 1, wherein the polybutene (C) is a homopolymer of 1-butene or a copolymer consisting of 1-butene and an olefin other than 1-butene and having a 1-butene content of not less than 50% by mol.

9. An automobile interior trim part produced from the polyolefin composition of claim 1.

10. The automobile interior trim part as claimed in claim 9, which is produced by vacuum forming, stamping, powder slush molding or injection molding.

11. An automobile seal part produced from the polyolefin composition of claim 1.

12. The automobile seal part as claimed in claim 11, which is produced by extrusion molding or injection molding.

13. The polyolefin composition as claimed in claim 2, wherein the syndiotactic α-olefin-based copolymer (A) does not have a melting peak measured by a differential scanning calorimeter (DSC) and has an intrinsic viscosity [η], as measured in decalin at 135° C., of 0.01 to 10 dl/g, a molecular weight distribution (Mw/Mn), as determined by GPC, of not more than 4 and a glass transition temperature (Tg) of not higher than −5° C.

14. The polyolefin composition as claimed in claim 4, wherein the polybutene (C) is a homopolymer of 1-butene or a copolymer consisting of 1-butene and an olefin other than 1-butene and having a 1-butene content of not less than 50% by mol.

15. An automobile interior trim part produced from the polyolefin composition of claim 8.

16. An automobile seal part produced from the polyolefin composition of claim 8.

* * * * *